(12) United States Patent
Winkler et al.

(10) Patent No.: US 8,206,037 B2
(45) Date of Patent: Jun. 26, 2012

(54) LINEAR GUIDE

(75) Inventors: Thomas Winkler, Sulzbach/Neuwiler (DE); Dietmar Rudy, Kleinbundenbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 423 days.

(21) Appl. No.: 12/512,485

(22) Filed: Jul. 30, 2009

(65) Prior Publication Data

US 2010/0027922 A1    Feb. 4, 2010

(30) Foreign Application Priority Data

Jul. 31, 2008   (DE) .................. 10 2008 035 721
Nov. 14, 2008   (DE) .................. 10 2008 057 397

(51) Int. Cl.
*F16C 29/12*    (2006.01)
(52) U.S. Cl. ............................ 384/49; 384/45
(58) Field of Classification Search .............. 384/57, 384/40, 43, 45, 49
See application file for complete search history.

(56) References Cited

U.S. PATENT DOCUMENTS 3,389,625 A * 6/1968 Wagner ................... 384/57
4,334,717 A * 6/1982 Polidor ................... 384/49

* cited by examiner

*Primary Examiner* — William C Joyce
(74) *Attorney, Agent, or Firm* — Lucas & Mercanti, LLP; Klaus P. Stoffel

(57) ABSTRACT

A linear guide, which has at least one approximately U-shaped carriage with side limbs that engage at least partially over a guide rail, at least two recirculating ball shoes for the longitudinally movable support of the carriage with respect to the guide rail and adjusting means for pressing the recirculating ball shoes against the guide rail without play. At least one component is provided which has, in cross-section, at least one wedge-shaped portion, which projects at least partially into a likewise wedge-shaped intermediate space between at least one recirculating ball shoe and one of the side limbs. It is possible to realize reliable and automatic play adjustment which can be realized in a cost-effective manner, with a compact design of the linear guide being maintained.

7 Claims, 6 Drawing Sheets

LINEAR GUIDE

This application claims the priority of DE 10 2008 035 721.9 filed Jul. 31, 2008 and of DE 10 2008 057 397.3, filed Nov. 14, 2008, which are incorporated by reference herein.

FIELD OF THE INVENTION

The invention relates to a linear guide, comprising at least one approximately U-shaped carriage with side limbs which engage at least partially over a guide rail, and comprising at least two linear ball bearing units for the longitudinally movable support of the carriage with respect to the guide rail, with adjusting means being provided for pressing the linear ball bearing units against the guide rail without play.

BACKGROUND OF THE INVENTION

Linear guides of said type are used in particular in the field of industrial assembly and handling. In this field, use is preferably made of aluminum structural profiles of modular construction, from which it is possible to construct assembly devices which are very easy to automate. The linear guides, which are expediently also produced from aluminum, are likewise of modular construction, such that their dimensions, in particular their guide width, can be variably configured. However, devices which are constructed from modular structural profiles fundamentally have relatively large tolerances. U-shaped carriages for holding the linear ball bearing units are likewise afflicted with relatively large tolerances. Uniform, play-free running of the linear guides is however demanded, such that it is necessary for the linear ball bearing units in the carriage to be pressed laterally against the guide rail in order to compensate tolerances.

Known from the product catalog of the applicant is a generic linear guide in which the adjusting means for pressing the linear ball bearing units against the guide rail without play are embodied as adjusting screws arranged in the carriage at one side. The running behavior of the linear guide after the exertion of the play-free pressing action by means of the screws is, however, dependent significantly on the manual dexterity of the respective assembly technician. The adjustment gap which exists in the receptacle region of the U-shaped carriage also varies on account of tolerances. Furthermore, the screws which are used are very small on account of the available installation space, such that the exertion of a pressing action with a predetermined torque also does not appear to be expedient.

Overall, a reliable establishment of freedom from play and corresponding running quality is difficult to achieve in this way. Furthermore, in the event of torsion acting in the carriage under oscillating load, the adjusting screws can loosen again despite additional securing measures, and an initially-set freedom from play in the linear guide is then eliminated.

Furthermore, EP 0 353 390 A1 discloses a fastening arrangement for a recirculating shoe of a linear guide in which the pressing of the recirculating shoe is realized by means of an eccentric arrangement.

DE 100 16 606 B4, in contrast, describes a device for adjusting the play of a linear guide in which the play is adjusted by means of an expanding element designed as a hollow body.

DE 39 31 351 A1 discloses a recirculating ball unit for a linear guide in which the adjustment of the play is realized by means of a tensioning device which has a tensioning bolt which is of conical design at the end side and which engages with the cone end into a likewise conical bore.

Finally, DE 201 06 914 U1 discloses a linear guide in which, to avoid the use of pressing screws or other manually actuated pressing devices, sliding elements with inclined surfaces are provided, which inclined surfaces interact with actuating elements which likewise have inclined surfaces. Here, the interacting inclined surfaces are also of stepped design in order, in the event of excessive play, to permit a relative movement between the sliding surfaces until the play has been reduced to a minimum value, such that the steps of the interacting surfaces bear against one another with their edges.

OBJECT OF THE INVENTION

The invention is based on the object of further developing a generic linear guide in such a way as to enable reliable, automatic play adjustment with little structural expenditure and with low production costs.

DESCRIPTION OF THE INVENTION

The invention therefore proceeds from a linear guide, comprising at least one approximately U-shaped carriage with side limbs which engage at least partially over a guide rail, and comprising at least two linear ball bearing units for the longitudinally movable support of the carriage with respect to the guide rail, with adjusting means being provided for pressing the linear ball bearing units against the guide rail without play. To achieve said object, it is also provided that, as adjusting means, at least one component is provided which has, in cross section, at least one wedge-shaped portion, which projects at least partially into a likewise wedge-shaped intermediate space between at least one linear ball bearing unit and one of the side limbs.

By means of said design, a reliable, automatic device for play adjustment is realized which permits a compact construction of the linear guide. Furthermore, the structural design of said play adjusting means can be produced in a relatively simple and therefore cost-effective manner and is reliably manageable.

The subclaims describe preferred refinements or embodiments of the invention.

According to a first advantageous refinement of the invention, it is provided that said component is approximately U-shaped in cross section, having two U-limbs which are connected by means of a central cross-sectional portion, with one U-limb forming the wedge-shaped portion and the other U-limb being designed for fastening the component to the side limb of the carriage. This design contributes to the compact design of the overall arrangement.

A second, highly expedient refinement of the invention provides that the cross section of the component is designed such that the cross-sectional portions can move resiliently relative to one another. This permits optimum adaptability of the component to the physical geometric boundary conditions of the surrounding structure, and therefore contributes to ensuring functionality.

The component can be assembled in a very simple manner without additional auxiliary means, if it is provided that the U-limb which is situated opposite the wedge-shaped U-limb is provided, at its free end, with an angled portion which points in the direction of the wedge-shaped U-limb, which angled portion interacts with a recess situated in the side limb of the carriage. Here, the angled portion preferably has an angle value of between approximately 40° and 50°, preferably of approximately 45°.

It has proven to be highly advantageous for the wedge-shaped U-limb to be formed by an oblique surface, with said surface having an angle with respect to an imaginary straight surface of approximately 0.5° to 45°, preferably of approximately 5° to 10°.

To avoid merely punctiform lateral support of the linear ball bearing units, it is possible in an extremely expedient refinement of the concept of the invention to provide that the component is of elongate design in relation to its cross-sectional extent. The component particularly advantageously extends at least over the entire length of the linear ball bearing unit.

BRIEF DESCRIPTION OF THE DRAWINGS

The invention is explained in more detail below on the basis of the appended drawing of a preferred exemplary embodiment, in which.

DETAILED DESCRIPTION OF THE DRAWINGS

Figure 1:
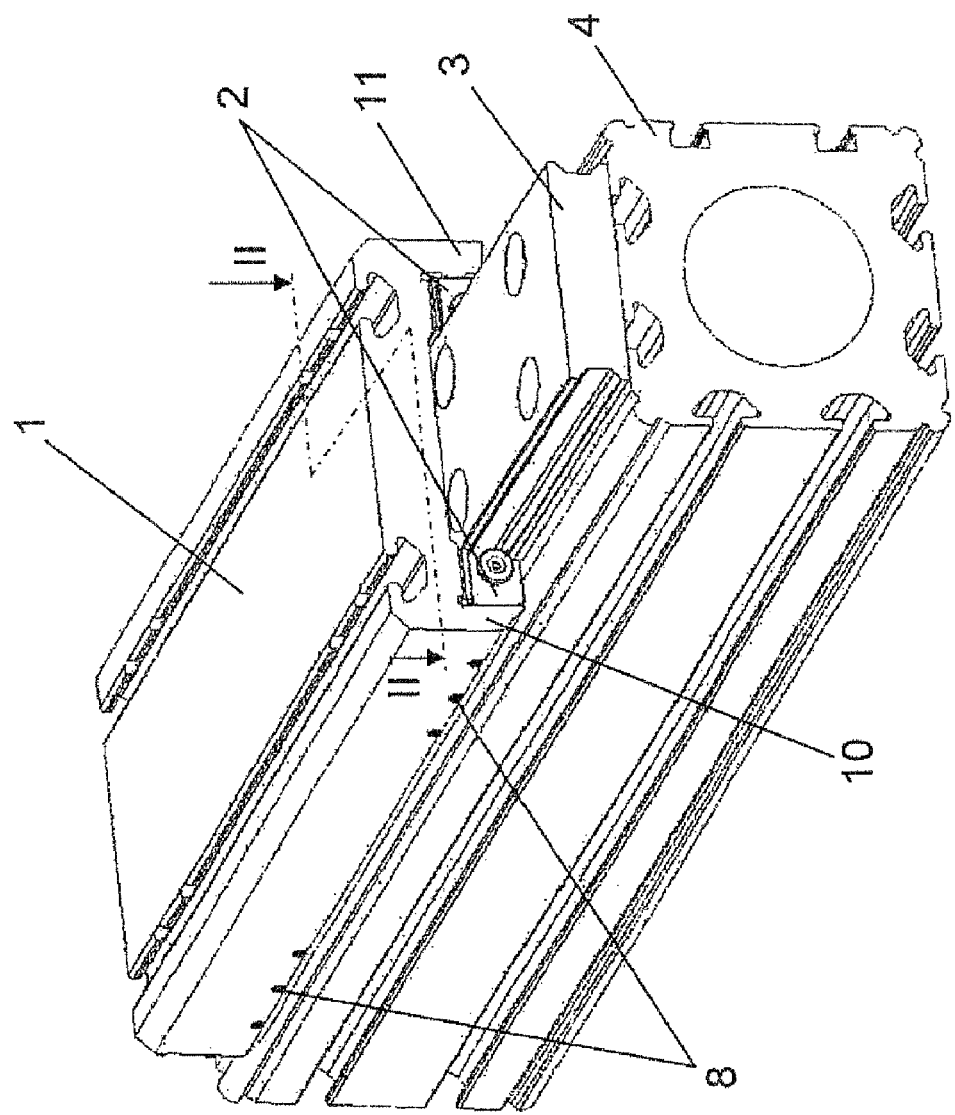
FIG. 1 shows a perspective illustration of a linear guide according to the prior art.
Figure 2:
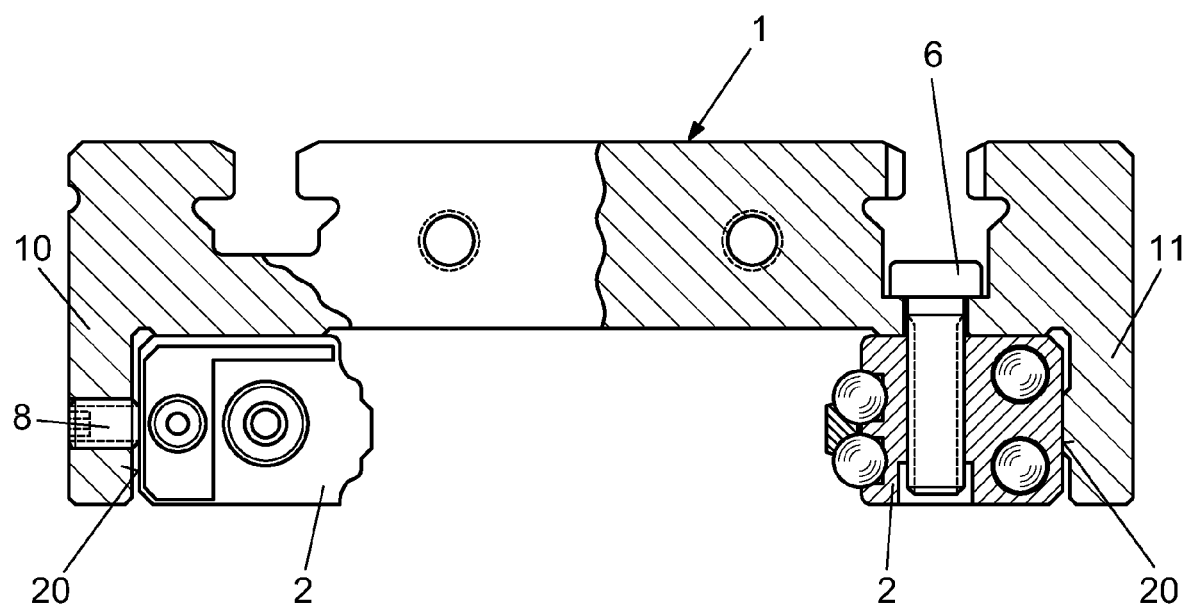
FIG. 2 shows a sectioned illustration of the known linear guide as per the sectioned illustration II-II from FIG. 1 with a partial section, but without the guide rail.

In the following description of the figures, identical components are provided with the same reference symbols. Reference is made first to FIGS. 1 and 2.

FIG. 1 shows a known linear guide from the applicant, having an approximately U-shaped carriage 1, which has a first side limb 10 and a second side limb 11, with the side limbs 10, 11 engaging in each case over a linear ball bearing unit 2 which movably supports the carriage 1 against a guide rail 3. The linear ball bearing units 2 have reference sides 20 which face away from the guide rail 3 and by means of which said reference sides 20 come into contact with the second side limb 11 or with adjusting screws 8 for the play-free pressing of the linear ball bearing units 2 against the guide rail 3. Also illustrated in FIG. 1 is a structural profile 4 to which the guide rail 3 is fastened. The linear ball bearing units 2 are each connected to the carriage 1 by means of a screw connection 6.

Figure 3:
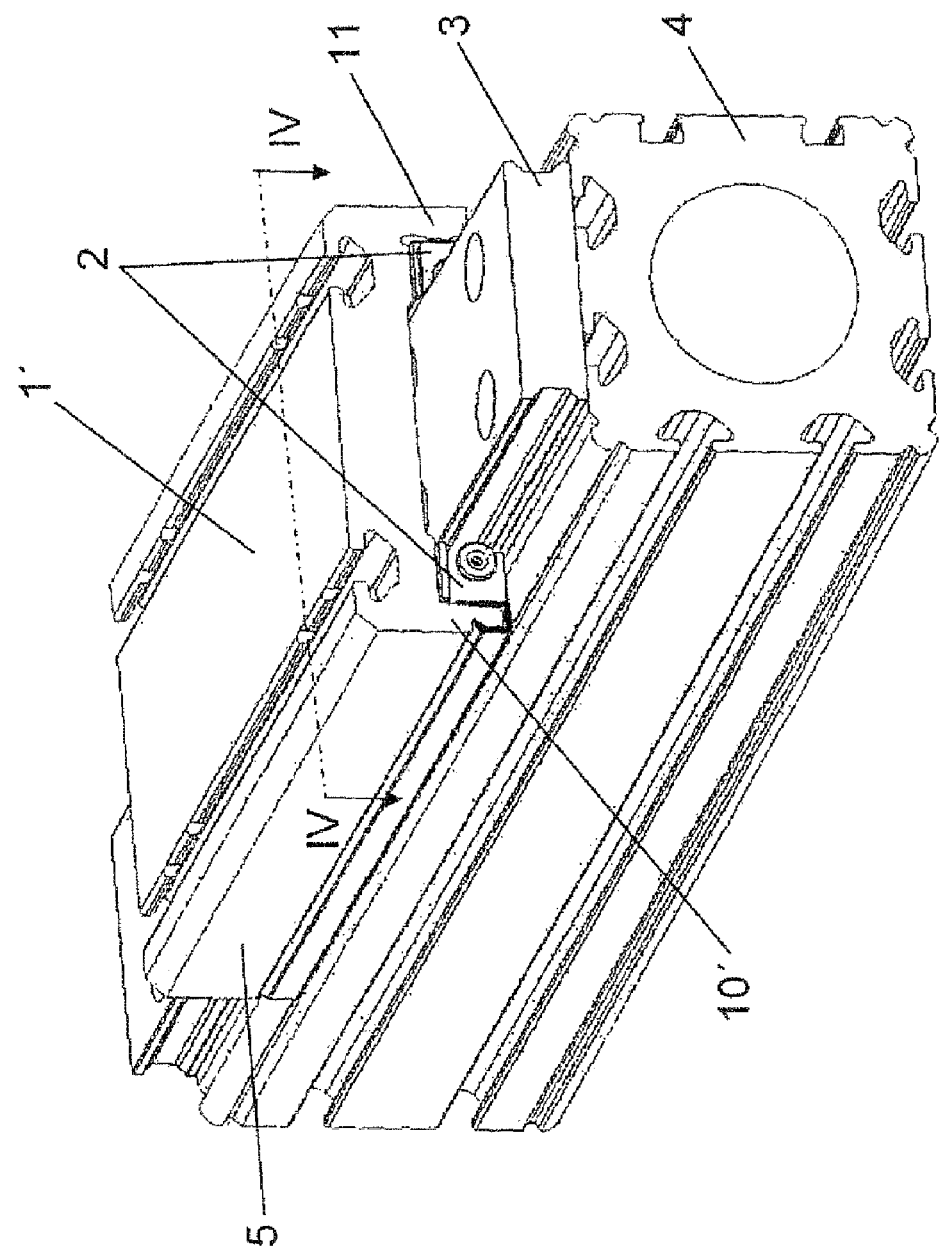
FIG. 3 shows a perspective illustration of a linear guide according to the invention.
Figure 4:
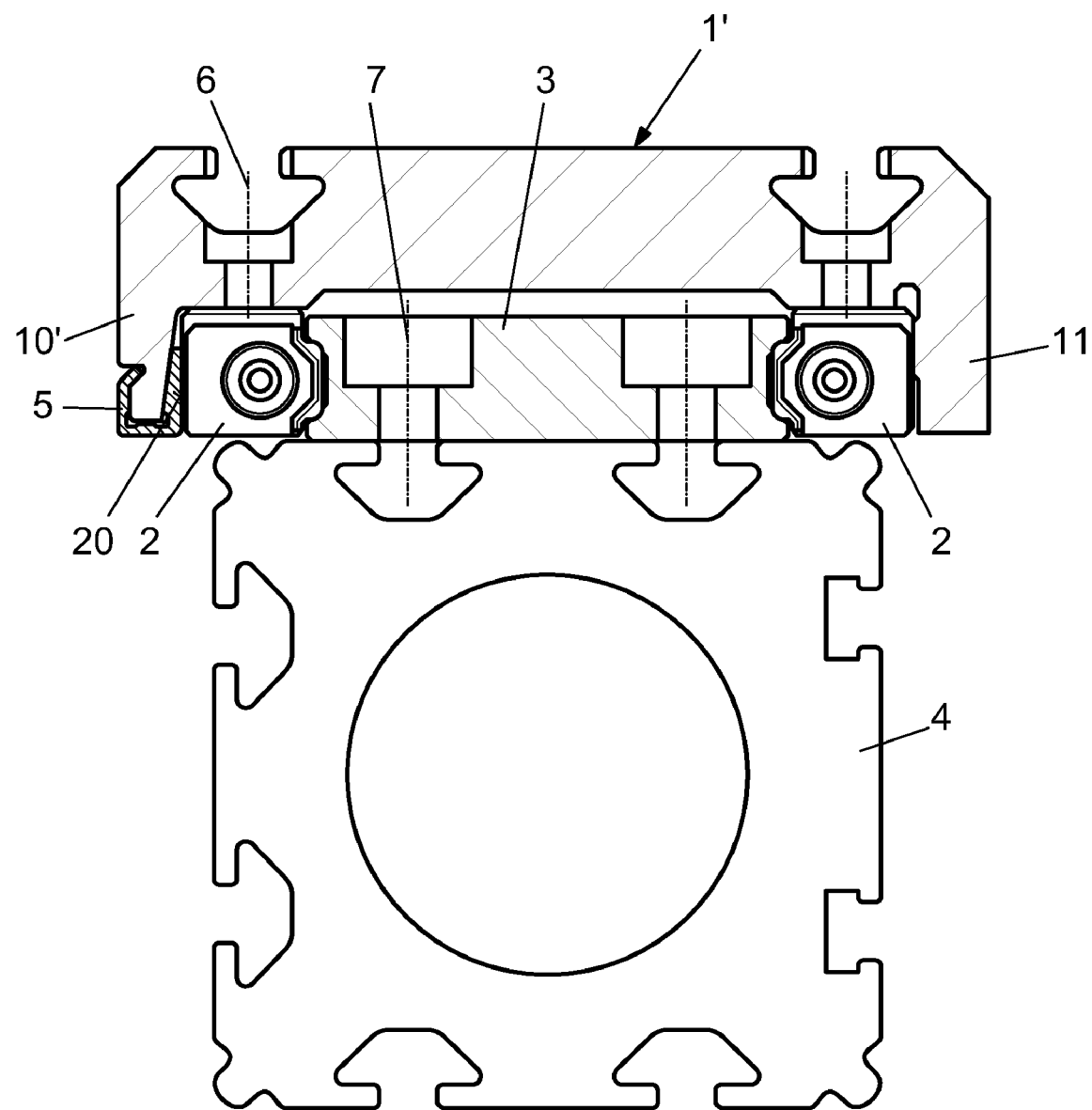
FIG. 4 shows a sectioned illustration of the linear guide according to the sectioned view IV-IV in FIG. 3.

With reference to FIGS. 3 and 4, a description will now be given of a linear guide according to the invention, with said linear guide having a carriage 1' which is modified in relation to the prior art and which has a modified first side limb 10'. In contrast to the linear guide according to FIG. 1, an elongated component 5 is fastened to the first side limb 10', which component 5 extends over the entire length of the carriage 1' and, with its cross section, projects partially between the side limb 10' and the reference side 20 of the adjacent linear ball bearing unit 2. It should be mentioned that the linear ball bearing units 2, which are known per se, may be arranged individually or in multiple form, for example in pairs, on each side of the carriage, and the length of the component 5 extends preferably over at least the length of a linear ball bearing unit 2. The linear ball bearing units 2 are fastened to the carriage 1' by means of suitable screw connections 6, and the guide rail 3 is fastened to the structural profile 4 by means of corresponding screw connections 7.

Figure 5:
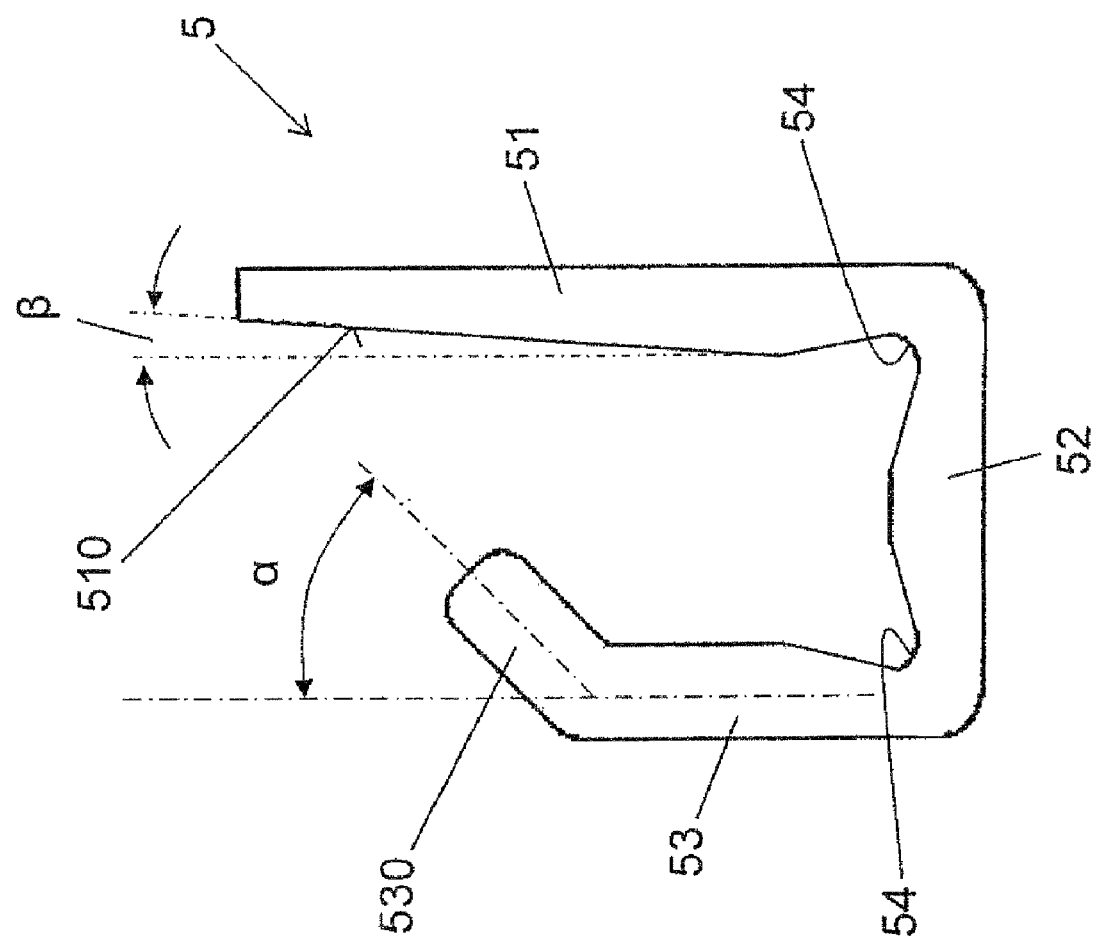
FIG. 5 shows a greatly enlarged end-side view, not to scale, of the component for the play-free pressing of the linear ball bearing units.

Below, a detailed description of the component 5 for pressing the linear ball bearing units 2 in the carriage 1' against the guide rail 3 without play will be given on the basis of FIG. 5. As can be seen from the end view which is shown, the component 5 is substantially U-shaped in cross section, having a first portion (U-limb) 51, a second portion 52 and a third portion (U-limb) 53. Here, the second portion 52 connects the two portions 51 and 53 to one another in a unipartite fashion.

It can also be seen that the first portion 51 has an oblique surface 510, which points approximately in the direction of the third portion 53, and which encloses an angle β of approximately 7° with respect to an imaginary straight surface. In this way, the first portion 51 is of wedge-shaped design. It can also be seen that the third portion 53 is provided, at its free end, with an angled portion 530 aligned in the direction of the portion 51, with the angled portion 530 enclosing an angle α of approximately 45° with the remaining part of the portion 53. The portions 51 and 53 are connected to one another via thinned material portions 54, such that said portions 51 and 53 can move resiliently relative to one another. The component 5 is preferably produced from shaped spring steel or from an extruded aluminum profile. It would likewise be possible to use a plastic with a high level of temperature resistance and creep resistance.

Figure 6:
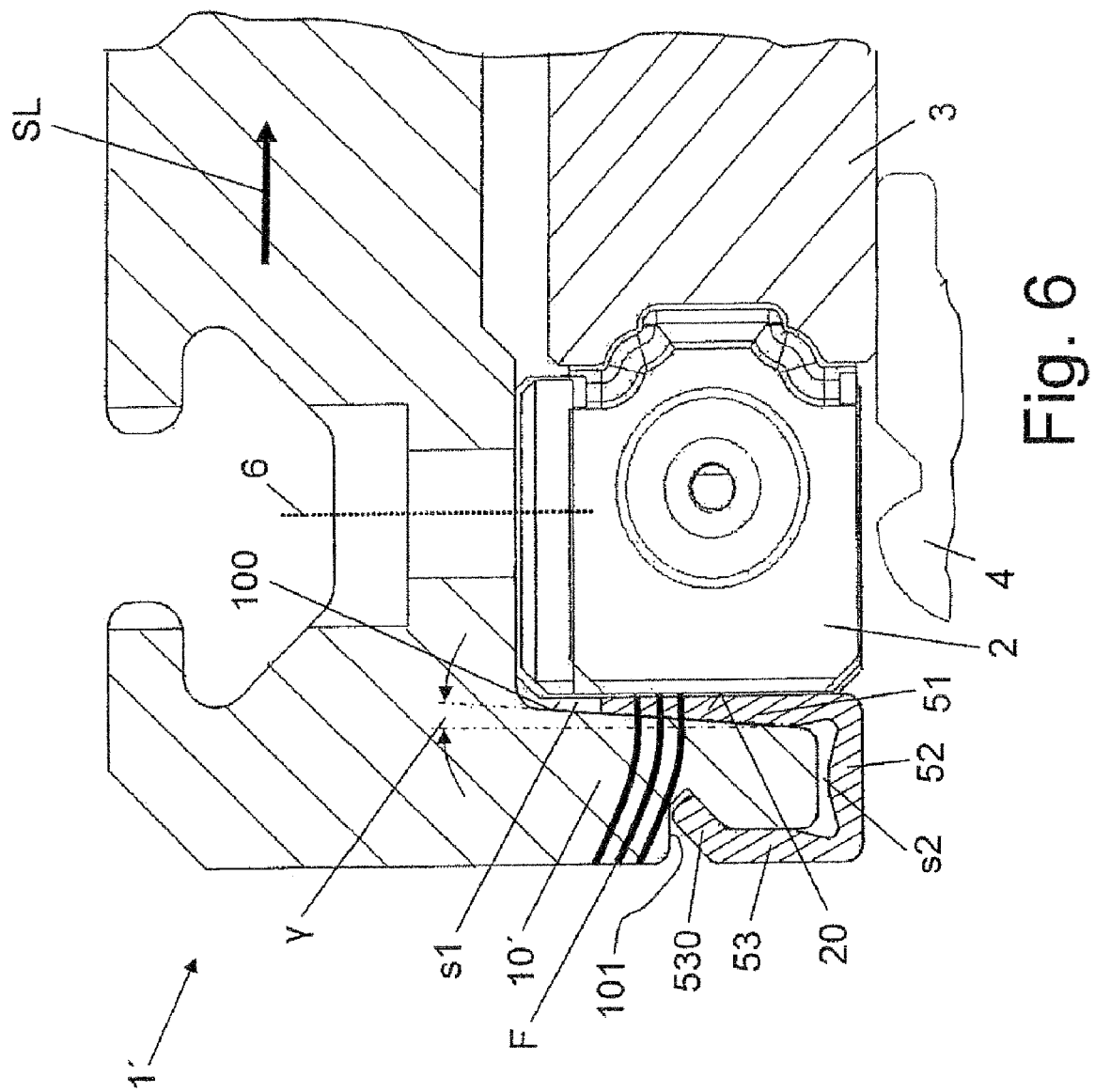
FIG. 6 shows an enlarged illustration of the linear guide according to the sectioned illustration in FIG. 4, with only one half of the arrangement being illustrated.

FIG. 6 shows, in an enlarged illustration, how the component 5 is integrated into the linear guide. It can be seen that the side limb 10' has an oblique surface 100 which encloses an angle γ with respect to an imaginary straight surface, which angle γ corresponds approximately to the angle β of the component 5. It can be seen that, in this way, a substantially vertically aligned, gap-like intermediate space s1 is formed between the first side limb 10' and the linear ball bearing unit 2, which intermediate space s1 is of wedge-shaped design in the same way as the portion 51 of the component 5.

It can also be seen that the component 5 engages with its angled portion 530 in a latching or snapping manner into a recess 101, which is designed so as to correspond to said angled portion 530, in the outer side of the first side limb 10'. For assembly, it is merely necessary for the component 5 to be pushed in a latching fashion over the end of the first side limb 10' from below. In said assembly position, the linear ball bearing unit 2 is pressed laterally against the guide rail 3 by the wedge action, until said linear ball bearing unit 2 bears without play against said guide rail 3. The linear ball bearing units 2 can thereafter finally be fastened to the carriage 1' by means of the screw connections 6.

The wedge-shaped portion 51 of the component 5 is pressed uniformly into the wedge-shaped intermediate space s1 by the spring action of the component 5. Here, it is possible for tolerances, in particular in the width of the intermediate space s1, to be reliably bridged, and for the resulting pressing forces to be reliably maintained. The linear ball bearing unit 2, once a pressing action is exerted on it, is supported substantially over the full area of the reference side 20 of the linear ball bearing unit 2, since the component 5 (as already mentioned) extends at least over the entire length of a linear ball bearing unit 2. In this way, an optimum force flow F is ensured between the linear ball bearing unit 2 and the side limb 10' in the event of a side load SL.

Varying widths, on account of tolerances, of the intermediate space s1 are manifested in a different dimension of a substantially horizontally aligned, gap-like intermediate space s2 which is formed between the side limb 10' and the second portion 52 of the component 5. A loss of freedom from play under constant use of the linear guide is prevented.

LIST OF REFERENCE SYMBOLS 1, 1' Carriage
10, 10' First side limb of the carriage
100 Oblique surface in the side limb of the carriage
101 Recess in the side limb of the carriage
11 Second side limb of the carriage
2 Linear ball bearing unit
20 Reference side of linear ball bearing unit
3 Guide rail
4 Structural profile
5 Component for pressing the linear ball bearing unit in the carriage against the guide rail without play
51 First cross-sectional portion of the component
510 Oblique surface
52 Second cross-sectional portion of the component
53 Third cross-sectional portion of the component
530 Angled portion
54 Thinned material portions
6 Screw connection of the linear ball bearing unit to the carriage
7 Screw connection of the carriage to the structural profile
8 Adjusting screws for pressing the linear ball bearing unit in the carriage against the guide rail without play
F Force flow
s1 Vertically aligned, gap-like intermediate space between the side limb of the carriage and the linear ball bearing unit
s2 Horizontally aligned, gap-like intermediate space between the side limb of the carriage and the component 5
SL Side load
α Angle of the angled portion
β Angle of the oblique surface of the first cross-sectional portion of the component 5
γ Angle of the oblique surface of the first side limb 10'

The invention claimed is:

1. A linear guide, comprising:
at least one approximately U-shaped carriage with side limbs engaging at least partially over a guide rail; and
at least two linear ball bearing units for a longitudinally movable support of the carriage with respect to the guide rail, with adjusting means being provided for pressing the linear ball bearing units against the guide rail without play,
wherein, as adjusting means, at least one component is provided which has, in cross-section, at least one wedge-shaped portion, which projects at least partially into a likewise wedge-shaped intermediate space between at least one of the linear ball bearing units and one of the side limbs, and
wherein the component is approximately U-shaped in cross-section, having two U-limbs which are connected by means of a central portion, with one U-limb forming the wedge-shaped portion and the other U-limb being designed for fastening the component to one of the side limbs of the carriage.

2. The linear guide according to claim 1, wherein the cross-section of the component is designed such that cross-sectional portions move resiliently relative to one another.

3. The linear guide according claim 1, wherein the U-limb, which is situated opposite the wedge-shaped U-limb, is provided, at its free end, with an angled portion pointing towards the wedge-shaped U-limb, the angled portion interacting with a recess situated in one of the side limbs of the carriage.

4. The linear guide according to claim 3, wherein the angled portion has an angle value between 40° and 50°.

5. The linear guide according to claim 1, wherein the wedge-shaped U-limb has an oblique surface, the surface having an angle with respect to an imaginary straight surface of 0.5° to 45°.

6. The linear guide according to claim 1, wherein the component is of elongate design in relation to its cross-sectional extent.

7. The linear guide according to claim 1, wherein the component extends at least over an entire length of one of the linear ball bearing units.

* * * * *